United States Patent
Yeo et al.

(10) Patent No.: US 11,184,190 B2
(45) Date of Patent: Nov. 23, 2021

(54) COMMUNICATION METHOD AUTOMATICALLY INCREMENTING IDS OF ICS HAVING DAISY CHAIN CONNECTION STRUCTURE, AND IC COMMUNICATION DEVICE PERFORMING THE METHOD

(71) Applicant: HYUNDAI MOBIS CO., LTD, Seoul (KR)

(72) Inventors: Yeong-Geun Yeo, Seoul (KR); Seulkirom Kim, Seoul (KR); Jae-Min Park, Yongin-Si (KR); Jae-Seong Park, Ansan-Si (KR); Sang-Ho Lee, Suwon-Si (KR); Jong-Won Choi, Suwon-Si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 127 days.

(21) Appl. No.: 16/573,766

(22) Filed: Sep. 17, 2019

(65) Prior Publication Data
US 2020/0092135 A1 Mar. 19, 2020

(30) Foreign Application Priority Data
Sep. 18, 2018 (KR) .................... 10-2018-0111418

(51) Int. Cl.
*H04L 12/40* (2006.01)
*H04L 12/42* (2006.01)
*H04L 29/08* (2006.01)

(52) U.S. Cl.
CPC .. *H04L 12/40039* (2013.01); *H04L 12/40013* (2013.01); *H04L 12/42* (2013.01);
(Continued)

(58) Field of Classification Search
None
See application file for complete search history.

(56) References Cited

U.S. PATENT DOCUMENTS

2004/0117537 A1* 6/2004 Marcel Vandensande ................. H04L 12/42 710/305
2014/0091770 A1* 4/2014 Lee ....................... H02J 7/0068 320/135

(Continued)

FOREIGN PATENT DOCUMENTS

KR 10-2007-0117147 A 12/2007
KR 10-2008-0008171 A 1/2008
(Continued)

OTHER PUBLICATIONS

Office Action issued in corresponding Chinese Patent Application No. 201910872853.7 dated Apr. 20, 2021, with English translation.

*Primary Examiner* — Jutai Kao
(74) *Attorney, Agent, or Firm* — Morgan, Lewis & Bockius LLP

(57) ABSTRACT

An IC communication device according to an embodiment of the present invention includes: a plurality of sensing ICs including a first sensing IC to an N-th sensing IC arranged to be adjacent (N is an integer equal to or greater than 2); and a controller connected to the first sensing IC, wherein when the controller in a sleep mode receives a wakeup signal and transmits the wakeup signal to the first sensing IC, the wakeup signal is transmitted in two directions to two sensing ICs, from the first sensing IC to the N-th sensing IC, arranged to be adjacent.

12 Claims, 5 Drawing Sheets

(52) U.S. Cl.
CPC .............. *H04L 29/08612* (2013.01); *H04L 2012/40273* (2013.01)

(56) References Cited

U.S. PATENT DOCUMENTS

| | | | |
|---|---|---|---|
| 2015/0095688 A1* | 4/2015 | Sugumar | G06F 13/4273 713/500 |
| 2018/0167301 A1* | 6/2018 | Hoglund | H04L 12/43 |

FOREIGN PATENT DOCUMENTS

| | | |
|---|---|---|
| KR | 10-2009-0030136 A | 3/2009 |
| KR | 10-2018-0045954 A | 5/2018 |
| KR | 10-2018-0053056 A | 5/2018 |

* cited by examiner ic communication method automatically incrementing IDs of ICs having daisy chain connection structure, and IC communication device performing the method

CROSS REFERENCE TO RELATED APPLICATION

This application is based on and claims priority under 35 U.S.C. 119 to Korean Patent Application No. 10-2018-0111418, filed on Sep. 18, 2018, in the Korean Intellectual Property Office, the disclosures of which is herein incorporated by reference in their entireties.

BACKGROUND OF THE INVENTION

Field of the Invention

The present invention relates to a communication method automatically incrementing IDs of ICs having a daisy chain connection structure and an IC communication device performing the method, and more specifically, to a communication method and an IC communication device performing the method, which can reduce communication current consumed by a plurality of ICs using a two-direction communication scheme.

Background of the Related Art

Recently, as digital techniques are adopted in most of vehicles and the number of electronic products mounted on the vehicles increases enormously, it needs to control the vehicle systems considering many variables inside and outside the vehicle. Accordingly, an electronic control unit (ECU) for vehicles is used to control all parts of a vehicle, such as a driving system and a steering system, as well as the functions of the engine.

The electronic control unit for vehicles is provided with one or more ICs therein to perform vehicle control functions, and to this end, the electronic control unit is supplied with power from an external power supply device (e.g., a battery).

However, when a plurality of ICs is provided in the electronic control unit, there is a problem of consuming a considerably amount of current to perform each of the functions.

Accordingly, although a method of switching the plurality of ICs to a sleep mode is used to minimize the amount of current consumed by the plurality of ICs, there is a problem in that much more battery current is consumed since it needs to wake up tens of ICs and assign an identification number to each IC to reactivate the ICs in the sleep mode.

Accordingly, a technique for minimizing the current consumed in the process of activating the tens of ICs is required, and the present invention relates to the technique.

(Patent Document 0001) Korean Laid-opened Patent No. 10-2009-0030136

SUMMARY OF THE INVENTION

Therefore, the present invention has been made in view of the above problems, and it is an object of the present invention to provide an IC communication method and an IC communication device, which can promptly switch a plurality of ICs in a sleep mode to a normal mode capable of communication.

The technical problems to be solved by the present invention are not limited to the technical problems mentioned above, and unmentioned other technical problems may be clearly understood by those skilled in the art from the following descriptions.

To accomplish the above object, according to one aspect of the present invention, there is provided an IC communication device comprising: a plurality of ICs including first to N-th ICs arranged to be adjacent (N is an integer equal to or greater than 2); and a controller connected to the first IC, wherein when the controller in a sleep mode receives a wakeup signal and transmits the wakeup signal to the first IC, the wakeup signal is transmitted in two directions to two ICs arranged to be adjacent among the first to N-th ICs.

According to an embodiment, the initial ID identification number before the controller receives the wakeup signal is set to 0, and the plurality of sensing ICs may be set to increment the ID identification number by 1 as one wakeup signal is received.

According to an embodiment, when at least one IC among the plurality of ICs receives the wakeup signal while the ID identification number is 1 or larger, the IC may transmit the wakeup signal in one direction not to the IC that has transmitted the wakeup signal, but to another IC arranged to be adjacent.

According to an embodiment, the first to N-th ICs may be connected in a daisy chain method.

To accomplish the above object, according to another aspect of the present invention, there is provided a communication method automatically incrementing IDs of ICs, as a method of performing IC communication by an IC communication device including first to N-th ICs arranged to be adjacent (N is an integer equal to or greater than 2), the method comprising: a first transmission step of transmitting a wakeup signal to the first IC, by the IC communication device; a second transmission step of simultaneously transmitting the wakeup signal transmitted at the first transmission step in two directions to a controller and the second IC arranged to be adjacent to the first IC, by the IC communication device; a third transmission step of simultaneously transmitting the wakeup signal transmitted at the second transmission step in two directions to the first IC and the third IC arranged to be adjacent to the second IC, by the IC communication device; and a step of simultaneously transmitting the wakeup signal transmitted at the third transmission step in two directions to two ICs arranged to be adjacent among the third to N-th ICs, by the IC communication device.

According to an embodiment, the first transmission step may further include a first identification step of incrementing the ID identification number of the first IC by 1 according to the wakeup signal transmitted at the first transmission step, and the second transmission step may further include a second identification step of incrementing the ID identification number of the second IC by 1 according to the wakeup signal transmitted at the second transmission step.

According to an embodiment, the third transmission step may further include a third identification step of incrementing the ID identification number of the third IC by 1 and additionally incrementing the ID identification number of the first IC by 1 according to the wakeup signal transmitted at the third transmission step.

According to an embodiment, the communication method may further comprise, after the third transmission step, a fourth transmission step of confirming the number of ICs arranged to be adjacent to the third IC, transmitting the wakeup signal transmitted at the third transmission step to the second IC arranged to be adjacent to the third IC when the IC arranged to be adjacent is confirmed to be one, and transmitting the wakeup signal in one direction to the controller connected to the first IC.

According to an embodiment, the fourth transmission step may further include a fourth identification step of additionally incrementing the ID identification number of the second IC by 1 according to the wakeup signal transmitted at the fourth transmission step.

According to an embodiment, the communication method may further comprise, after the fourth transmission step, a fifth transmission step of transmitting the wakeup signal in one direction to the first IC connected to the second IC.

According to an embodiment, the fifth transmission step may further include a fifth identification step of additionally incrementing the ID identification number of the first IC by 1 according to the wakeup signal transmitted at the fifth transmission step.

According to an embodiment, the communication method may further comprise, after the fifth identification step, a step of counting the number of received wakeup signals, comparing the counted number with a total IC number, and determining whether or not to set an ID identification number, by the controller.

DESCRIPTION OF SYMBOLS

100: IC communication device
10: First IC
20: Second IC
30: Third IC
50: Controller

DETAILED DESCRIPTION OF THE PREFERRED EMBODIMENT

Hereafter, the preferred embodiments of the present invention will be described in detail with reference to the accompanying drawings. Advantages and features of the present invention and methods for achieving the same will be more clearly understood from the embodiments described below with reference to the accompanying drawings. However, the present invention is not limited to the following embodiments but may be implemented in various different forms. The embodiments are provided merely to complete disclosure of the present invention and to fully provide a person having ordinary skill in the field of the art to which the present invention belongs with the category of the present invention. The present invention is defined only by the category of the claims. Wherever possible, the same reference numbers will be used throughout the specification to refer to the same parts.

Unless otherwise defined, all terms (including technical or scientific terms) used in this specification may be used as meanings that can be commonly understood by those with ordinary knowledge in the field of the art to which the present invention belongs.

In addition, such terms as those defined in a generally used dictionary are not to be ideally or excessively interpreted unless clearly defined. The terms used in this specification are for the purpose of describing the embodiments and are not intended to limit the present invention. In this specification, the singular forms include plural forms as well, unless the context clearly indicates otherwise.

Meanwhile, the terms "comprises" and/or "comprising" used in this specification mean that a constitutional element, a step, an operation and/or an element does not preclude the presence or addition of one or more other constitutional elements, steps, operations and/or elements.

Hereinafter, the present invention will be described in more detail with reference to the accompanying drawings.

Figure 1:
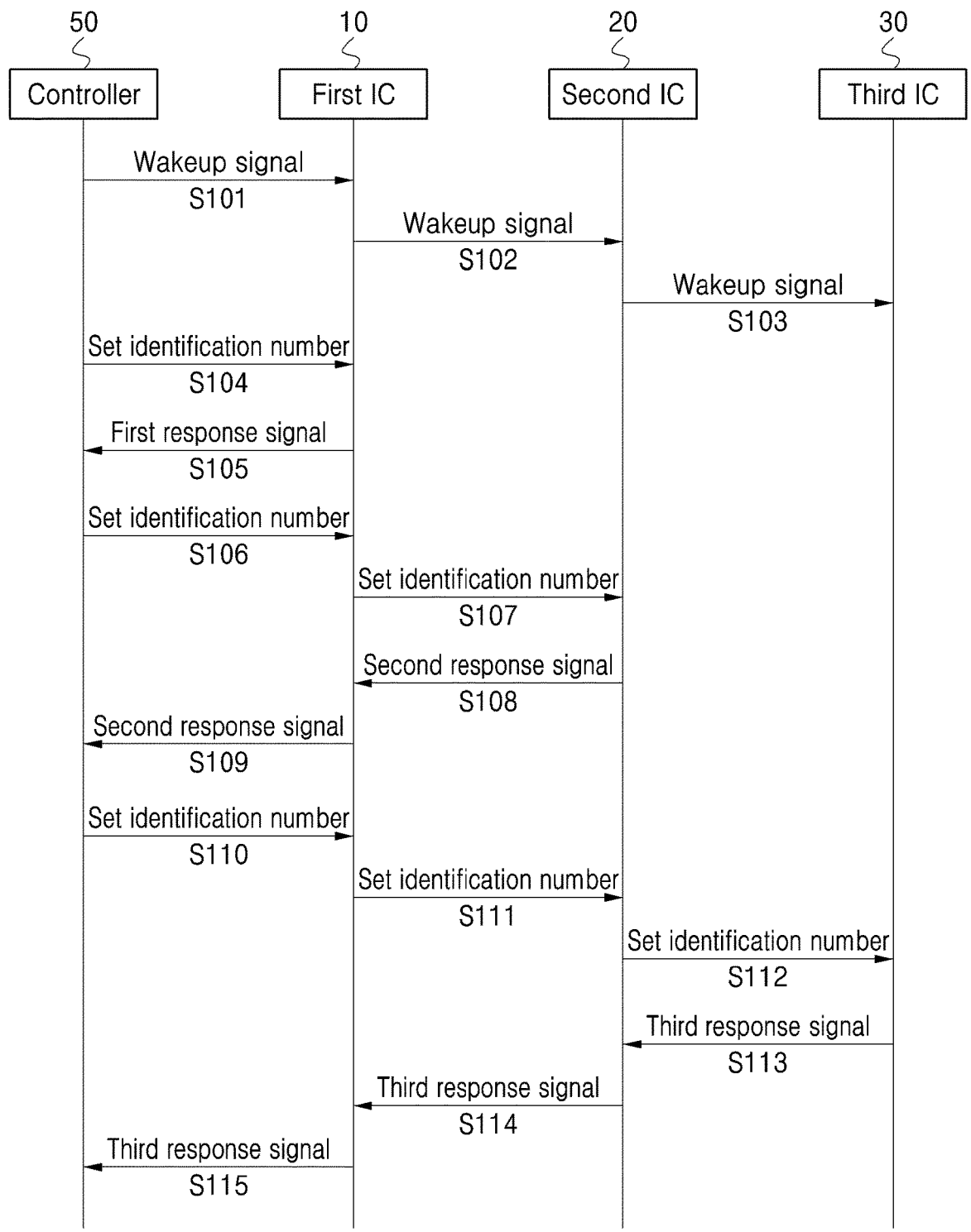
FIG. 1 is a sequence diagram illustrating a conventional network state switching method for operating a plurality of ICs.

FIG. 1 is a sequence diagram illustrating a conventional network state switching method for operating a plurality of ICs.

Referring to FIG. 1, as a wakeup signal is received from the outside, conventionally, a controller 50 in a sleep mode sequentially transfers the wakeup signal to a first IC 10, a second IC 20 and a third IC 30 in the sleep mode (steps S101, S102 and S103).

Accordingly, although the first IC 10, the second IC 20 and the third IC 30 are woke up according to the wakeup signal, the ICs do not have an ID identification number set for performing their functions, and the controller 50 transmits a signal for setting an ID identification number to the first IC 10, the second IC 20 and the third IC 30 to set the ID identification number.

That is, the controller 50 transmits a signal for setting an ID identification number to the first IC 10 (step S104), receives a first response signal informing that setting of the ID identification number is completed from the first IC 10 (step S105), transmits a signal for setting an ID identification number to the second IC 20 through the first IC 10 in the same manner as that of to the first IC 10 (steps S106 and S107), receives a second response signal from the second IC 20 in response thereto (steps S108 and S109), and sets an ID identification number to the third IC 30 through the same process after setting of an ID identification number to the second IC 20 is completed (steps S110 to S115).

Through the process like this, the first IC 10, the second IC 20 and the third IC 30 are switched to the normal mode in which setting of the ID identification numbers is completed.

However, the method of switching network states of a plurality of ICs from the sleep mode to the normal mode as shown in FIG. 1 has a problem in that when the number of ICs is large, a considerable time is consumed, and the amount of data used for communication between the controller 50 and the plurality of ICs is large.

Figure 2:
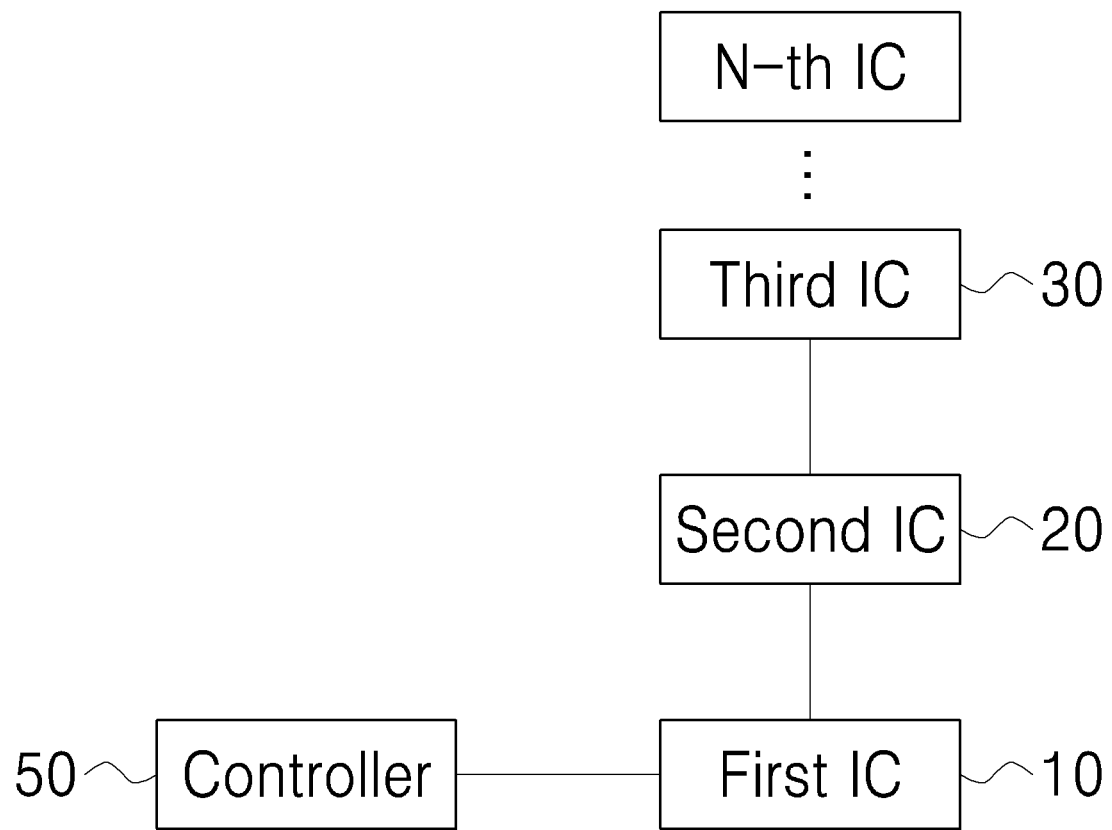
FIG. 2 is a view showing the configuration of an IC communication device according to an embodiment of the present invention.

FIG. 2 is a view showing the configuration of an IC communication device 100 according to an embodiment of the present invention.

Referring to FIG. 2, it can be confirmed that an IC communication device 100 according to an embodiment of the present invention includes a plurality of ICs (a first IC 10, a second IC 20, and a third IC 30 to an N-th IC (N is an integer equal to or greater than 2), and it is apparent that the IC communication device 100 may further include additional configurations for accomplishing the object of the present invention.

The plurality of ICs may perform a variety of functions for controlling electronic devices in a vehicle, and for example, the ICs may be the sensing ICs provided in a battery management system (BMS). Accordingly, the plurality of ICs are connected to a plurality of battery module (not shown) respectively and may sense voltage of a battery cell included in each of the battery modules.

In addition, the plurality of ICs may be connected in a daisy chain method. That is, as the first IC 10 is connected to the controller 50 and the second IC 20, the second IC 20 is connected to the first IC 10 and the third IC 30, and the third IC 30 is connected to the second IC 20 and the fourth IC (not shown), each of the ICs may include two ICs arranged to be adjacent.

As each IC includes two ICs arranged to be adjacent, the IC may transmit a wakeup signal in two directions, and further speedy switching of a network state may be performed through the two-direction communication. At this point, switching of a network state may mean switching from the sleep mode to the normal mode in which an ID identification number is set to each IC.

The controller 50 receives the wakeup signal in the first place from the outside and may transmit the wakeup signal to a plurality of ICs. More specifically, the controller 50 is connected to the first IC 10 and may transmit a wakeup signal to the first IC 10, and the wakeup signal may be transmitted to the first IC 10 to the N-th IC in order.

In addition, after transmitting the wakeup signal to the first IC 10, the controller 50 may receive a wakeup signal for the second IC 2 to the N-th IC from first IC 10 and may determine whether a plurality of ICs has been switched to the normal mode according to the number of received wakeup signals.

Until now, the configuration of the IC communication device 100 according to an embodiment of the present invention has been schematically described. According to the present invention, as a plurality of ICs connected in a daisy chain method performs two-direction communication, switching of a network state is performed in a speedy way, and thus an effect of reducing the amount of current consumed for IC communication switching can be derived. Hereinafter, an efficient method of switching a plurality of ICs to a normal mode, in which an ID identification number is assigned, according to a wakeup signal will be described.

Figure 3:
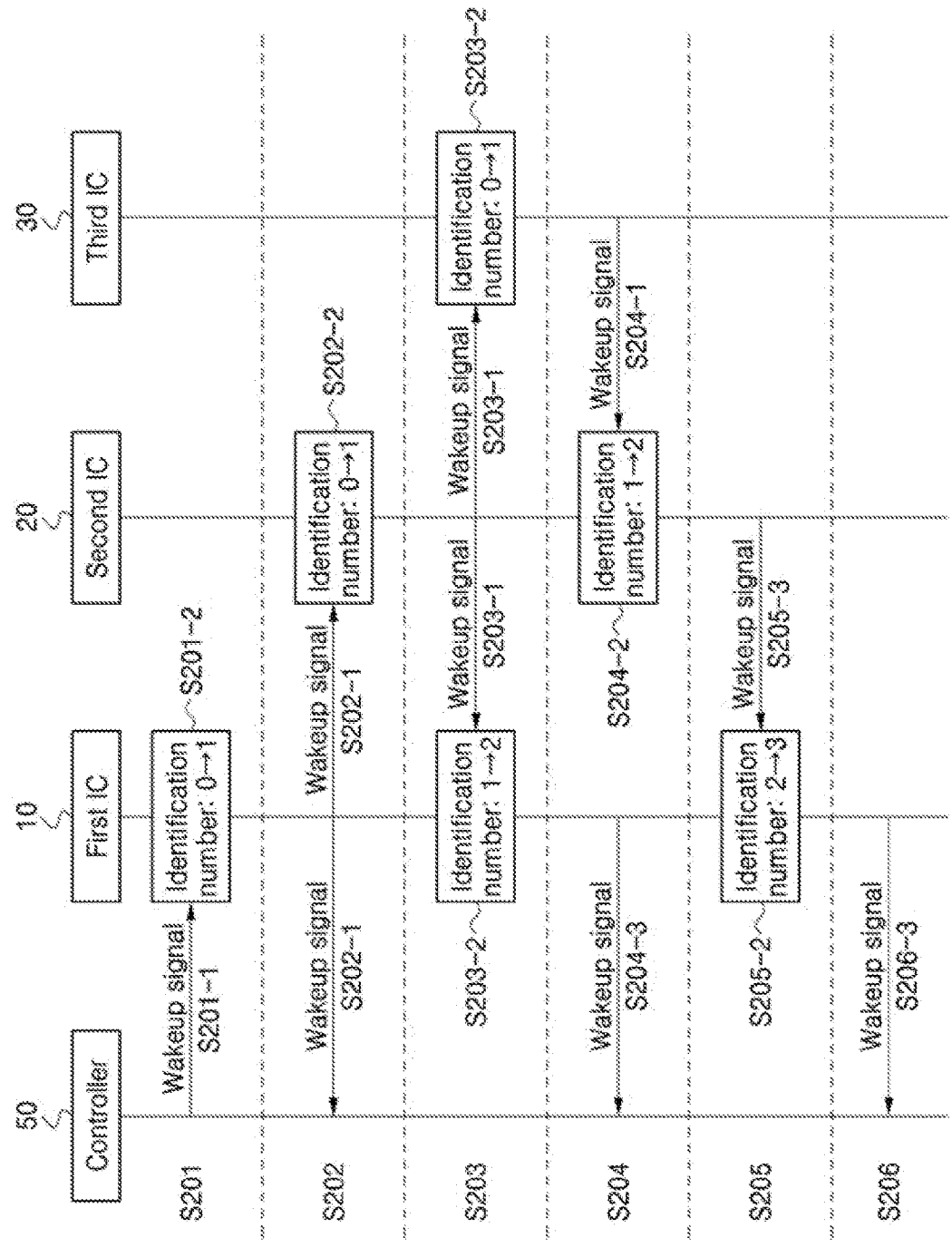
FIG. 3 is a sequence diagram illustrating a network state switching method for operating a plurality of ICs according to an embodiment of the present invention.

FIG. 3 is a sequence diagram illustrating a network state switching method for operating a plurality of ICs according to an embodiment of the present invention.

This is merely a preferred embodiment for accomplishing the object of the present invention, and it is apparent that some steps may be deleted or added as needed, and any one step may be included and performed in another step.

Meanwhile, before describing FIG. 3, although it is expressed that there are three ICs in FIG. 3, the number of ICs may be larger or smaller than this. For example, when the IC is a sensing IC for sensing voltage of a battery module, the number of ICs may vary according to the number of battery modules, and the number of sensing ICs may be the same as the number of battery modules. However, hereinafter, it is assumed that there are three ICs for the convenience of explanation.

In addition, for the convenience of explanation of the present invention, two-direction transmission of a signal (data) of an IC will be expressed as S20#-1, increment of an ID identification number of an IC will be expressed as S20#-2, and one-direction transmission of a signal (data) of an IC will be expressed as S20#-3.

First, when the controller 50 in the sleep mode receives a wakeup signal from the outside, it transmits the wakeup signal to the first IC 10 (step S201-1). At the same time, as the first IC 10 receives the wakeup signal, it increments the ID identification number from 0 to 1 (step S201-2). That is, as the wakeup signal is transmitted to at least one IC inside the IC communication device 100, the step of incrementing the ID identification number of the IC receiving the wakeup signal by 1 (step S201) may be performed.

After step S202, the first IC 10 that has incremented the ID identification number from 0 to 1 simultaneously transmits the wakeup signal in two directions to the controller 50 and the second IC 20 arranged to be adjacent to the first IC 10 (step S202-1). At the same time, as the second IC 20 receives the wakeup signal, the ID identification number is incremented from 0 to 1 (step S202-2).

Meanwhile, the controller 50 may count a corresponding wakeup signal, and when the wakeup signal counted by the controller 50 is '1', the controller 50 may determine that wakeup of the first IC 10 is completed and the ID identification number is set to 1.

After step S202 (S202-1 and S202-2), the second IC 20 that has incremented the ID identification number from 0 to 1 simultaneously transmits the wakeup signal in two directions to the first IC 10 and the third IC 30 arranged to be adjacent to the second IC 20 (step S203-1). At the same time, the third IC 30 receiving the wakeup signal increments the ID identification number from 0 to 1, and the first IC 10 receiving the wakeup signal increments the ID identification number from 1 to 2 (step S203-2).

After step S203 (S203-1 and S203-2), as the ID identification number of the third IC 30 is incremented from 0 to 1 and the ID identification number of the first IC 10 is incremented from 1 to 2, each of the ICs may perform a different communication step.

More specifically, when there are two ICs arranged to be adjacent to the third IC 30, the third IC 30 simultaneously transmits the wakeup signal in two directions to the two ICs (step S204-1), and the first IC 10 transmits the wakeup signal in one direction not to the second IC 20 that has received the wakeup signal, but to the controller 50 arranged to be adjacent to the first IC 10 (step S204-3), and at the same time, the second IC 20 receiving the wakeup signal increments the ID identification number from 1 to 2 (step S204-2).

In other words, when an IC in the IC communication device 100 receives a wakeup signal while the ID identification number is 0, the IC simultaneously transmits the wakeup signal in two directions to the two ICs arranged to be adjacent, and when the IC receives the wakeup signal while the ID identification number is greater than or equal to 1, the IC transmits the wakeup signal in one direction not to the IC that has transmitted the wakeup signal, but to the other IC arranged to be adjacent.

After step S204 (S204-1, S204-2 and S204-3), as the second IC 20 receives the wakeup signal from the third IC 30 while the ID identification number is not 0 like the first IC 10 described above, the second IC 20 transmits the wakeup signal in one direction to the first IC 10 arranged to be adjacent (step S205-3), and at the same time, the first IC 10 receiving the wakeup signal increments the ID identification number from 2 to 3 (step S205-2).

After step S205 (S205-1 and S205-2), the first IC 10 that has incremented the ID identification number from 2 to 3 transmits the wakeup signal in one direction not to the second IC 20 that has transmitted the wakeup signal, but to the controller 50 arranged to be adjacent (step S206-3).

Finally, the controller 50 may count the number of wakeup signals received from the first IC 10 from the time point of transmitting the wakeup signal, compare the number of counted wakeup signals with the total number of ICs, and determine whether all the ICs are woke up and switched to the normal mode in which an ID identification number is assigned to an IC.

That is, as shown in FIG. 3, when there are three ICs in total and the number of wakeup signals received from the first IC 10 is three, the controller 50 may confirm that a plurality of ICs is normally switched to the normal mode, and when the number of wakeup signals is smaller than this, it is determined that the IC communication is abnormally performed, and an error signal may be generated.

Until now, a network state switching method for operating a plurality of ICs according to an embodiment of the present invention has been described. According to the present invention, since an IC may set an ID identification number as soon as receiving a wakeup signal, without sequentially passing through the three steps of sleep mode, idle mode and normal mode, the time for switching network communication may be reduced, and accordingly, power consumption in the process of initiating communication of the IC communication device 100 can be reduced.

Figure 4A:
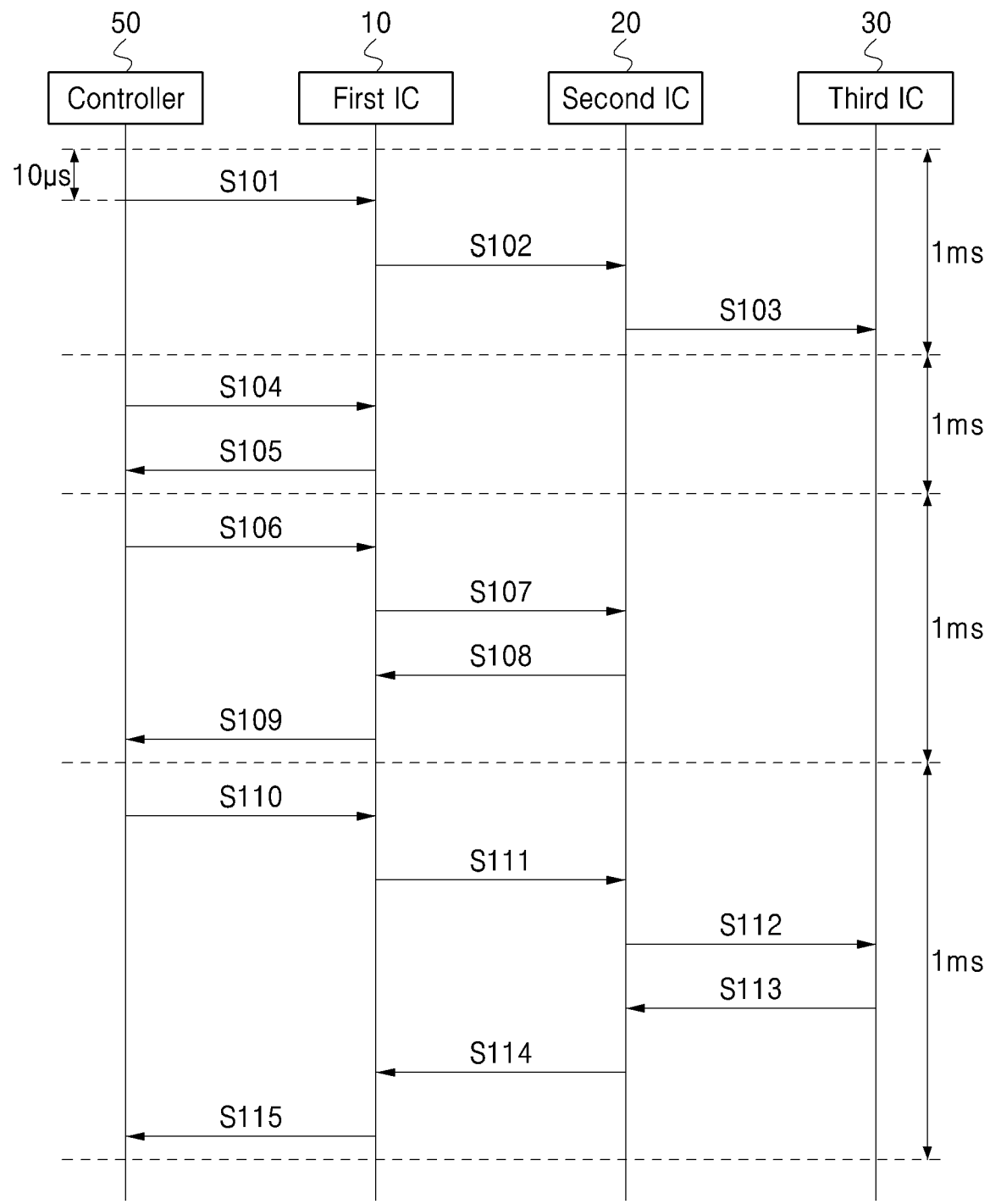
FIG. 4A is a sequence diagram showing the time consumed for switching network states of a plurality of ICs in a conventional method.
Figure 4B:
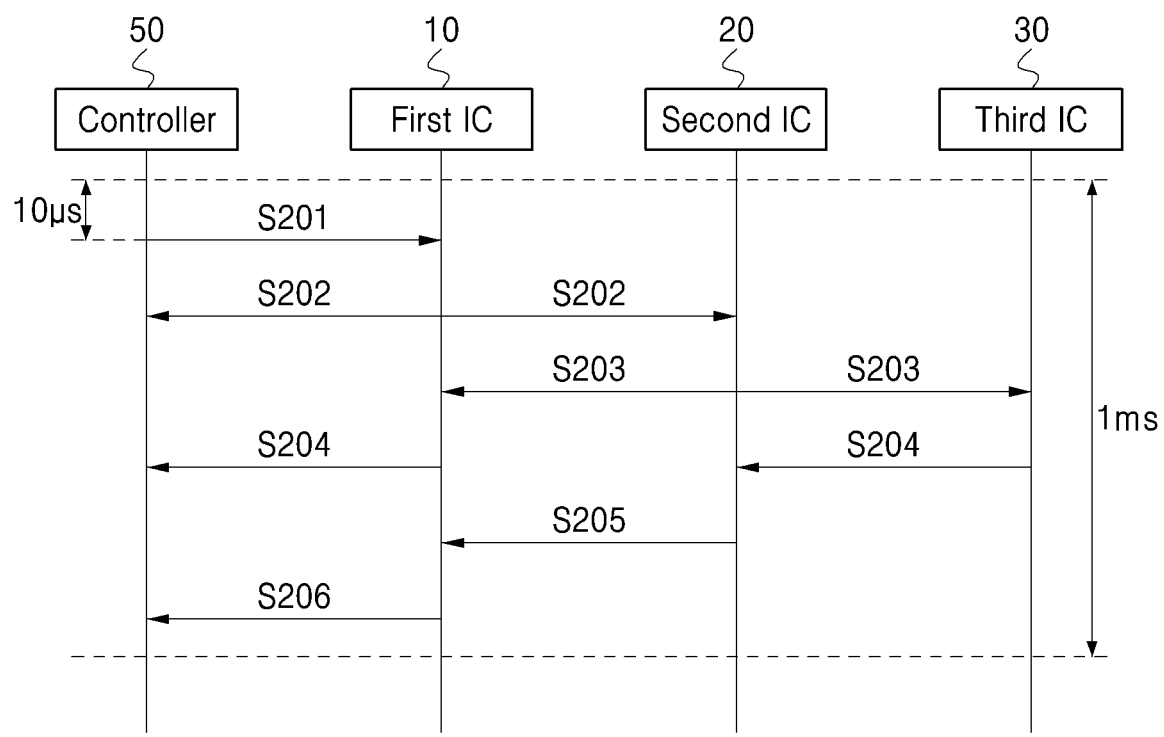
FIG. 4B is a sequence diagram showing the time consumed for switching network states of a plurality of ICs according to an embodiment of the present invention.

Meanwhile, as described above, since the IC communication method of the present invention may be performed more speedily and simply compared with conventional communication methods, the time for switching the network states of all the ICs may be reduced, and this is shown in FIGS. 4A and 4B.

FIG. 4A is a sequence diagram showing the time consumed for switching network states of a plurality of ICs in a conventional method, and FIG. 4B is a sequence diagram showing the time consumed for switching network states of a plurality of ICs according to an embodiment of the present invention.

Referring to FIG. 4A, in a conventional IC communication device, a wakeup signal transmitted from the controller 50 may reach the first IC 10, the second IC 20 and the third IC 30 in 1 ms (steps S101, S102 and S103), and after transmission of the wakeup signal is completed, the controller 50 may set an ID identification number and confirm setting of the ID identification number in 1 ms for each of the first IC 10, the second IC 20 and the third IC 30 (steps S104 to S115). Accordingly, a time of 4 ms in total may be consumed for the controller 50 to switch the three ICs from the sleep mode to the normal mode.

However, referring to FIG. 4B, in the IC communication device 100 of the present invention, setting of ID identification numbers may be completed in 1 ms as a wakeup signal transmitted from the controller reaches the first IC 10, the second IC 20 and the third IC 30 and increments the ID identification numbers and each IC performs two-direction communication with ICs arranged to be adjacent, and setting of the ID identification numbers may be confirmed as the controller 50 counts the number of finally received wakeup signals. That is, the IC communication device 100 of the present invention may efficiently switch a network state as switching to the normal mode is completed within the time of transmitting a wakeup signal (1 ms).

According to the present invention as described above, there is an effect of reducing the time consumed for switching to a normal mode as a plurality of ICs in a sleep mode communicates in two directions.

In addition, there is an effect of reducing the current consumed in the communication process among a plurality of ICs by differently setting transmission directions of a wakeup signal according to the ID identification number of each IC.

The effects of the present invention are not limited to the effects mentioned above, and unmentioned other effects may be clearly understood by those skilled in the art from the following descriptions.

Although the embodiments of the present invention have been described with reference to the accompanying drawings, those with ordinary knowledge in the field of the art to which the present invention belongs may understand that the present invention may be embodied in other specific forms without changing the technical spirit and essential features of the present invention. Therefore, the above-described embodiments are only illustrative, not restrictive, in all aspects.

What is claimed is:

1. An integrated circuit (IC) communication device comprising:
   a plurality of ICs including first to N-th ICs arranged to be adjacent wherein the-N is an integer equal to or greater than 2; and
   a controller connected to the first IC, wherein
   when the controller in a sleep mode receives a wakeup signal and transmits the wakeup signal to the first IC, the wakeup signal is transmitted in two directions to two ICs, from the first to N-th ICs, arranged to be adjacent.

2. The device according to claim 1, wherein an initial identifier (ID) identification number before the controller receives the wakeup signal is set to 0, and the plurality of sensing ICs is set to increment the ID identification number by 1 as one wakeup signal is received.

3. The device according to claim 2, wherein when at least one IC among the plurality of ICs receives the wakeup signal while the ID identification number is 1 or larger, the IC transmits the wakeup signal in one direction not to the IC that has transmitted the wakeup signal, but to another IC arranged to be adjacent.

4. The device according to claim 1, wherein the first to N-th ICs are connected in a daisy chain method.

5. A communication method automatically incrementing identifiers (IDs) of integrated circuits (ICs), as a method of performing IC communication by an IC communication device including first to N-th ICs arranged to be adjacent wherein the N is an integer equal to or greater than 2, the method comprising:
   a first transmission step of transmitting a wakeup signal to the first IC, by the IC communication device;
   a second transmission step of simultaneously transmitting the wakeup signal transmitted at the first transmission step in two directions to a controller and the second IC arranged to be adjacent to the first IC, by the IC communication device;
   a third transmission step of simultaneously transmitting the wakeup signal transmitted at the second transmission step in two directions to the first IC and the third IC arranged to be adjacent to the second IC, by the IC communication device; and
   a step of simultaneously transmitting the wakeup signal transmitted at the third transmission step in two directions to two ICs arranged to be adjacent among the third to N-th ICs, by the IC communication device.

6. The method according to claim 5, wherein the first transmission step further includes a first identification step of incrementing an ID identification number of the first IC by 1 according to the wakeup signal transmitted at the first transmission step, and the second transmission step further includes a second identification step of incrementing an ID identification number of the second IC by 1 according to the wakeup signal transmitted at the second transmission step.

7. The method according to claim 6, wherein the third transmission step further includes a third identification step of incrementing an ID identification number of the third IC by 1 and additionally incrementing the ID identification number of the first IC by 1 according to the wakeup signal transmitted at the third transmission step.

8. The method according to claim 7, further comprising, after the third transmission step, a fourth transmission step of confirming the number of ICs arranged to be adjacent to the third IC, transmitting the wakeup signal transmitted at the third transmission step to the second IC arranged to be adjacent to the third IC when the IC arranged to be adjacent is confirmed to be one, and transmitting the wakeup signal in one direction to the controller connected to the first IC.

9. The method according to claim 8, wherein the fourth transmission step further includes a fourth identification step of additionally incrementing an ID identification number of the second IC by 1 according to the wakeup signal transmitted at the fourth transmission step.

10. The method according to claim 9, further comprising, after the fourth transmission step, a fifth transmission step of transmitting the wakeup signal in one direction to the first IC connected to the second IC.

11. The method according to claim 9, wherein the fifth transmission step further includes a fifth identification step of additionally incrementing the ID identification number of the first IC by 1 according to the wakeup signal transmitted at the fifth transmission step.

12. The method according to claim 11, further comprising, after the fifth identification step, a step of counting the number of received wakeup signals, comparing the counted number with a total IC number, and determining whether or not to set an ID identification number, by the controller.

* * * * *